United States Patent
Ni et al.

(10) Patent No.: US 10,726,023 B2
(45) Date of Patent: Jul. 28, 2020

(54) GENERATING MODIFIERS FOR UPDATING SEARCH QUERIES

(71) Applicant: Microsoft Technology Licensing, LLC, Redmond, WA (US)

(72) Inventors: Xiaochuan Ni, Mountain View, CA (US); Satya Pradeep Kanduri, Mountain View, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 15/264,433

(22) Filed: Sep. 13, 2016

(65) Prior Publication Data
US 2018/0075162 A1 Mar. 15, 2018

(51) Int. Cl.
*G06F 16/2457* (2019.01)
*G06F 16/332* (2019.01)

(52) U.S. Cl.
CPC .... *G06F 16/24578* (2019.01); *G06F 16/3322* (2019.01)

(58) Field of Classification Search
CPC ........... G06F 16/24578; G06F 16/3322; G06F 16/635; G06F 16/285; G06F 16/35; G06F 16/735; G06F 16/90324; G06F 16/337; G06F 16/248; G06F 16/54; G06F 16/638; G06F 16/95; G06F 16/951; G06F 16/955; G06F 16/958; G06F 16/3334; G06F 16/5866

See application file for complete search history.

(56) References Cited

U.S. PATENT DOCUMENTS

| 2006/0224938 A1* | 10/2006 | Fikes | G06F 16/955 715/234 |
| 2008/0065600 A1* | 3/2008 | Batteram | G06F 16/335 |
| 2012/0096041 A1* | 4/2012 | Rao | G06F 16/337 707/794 |
| 2013/0110738 A1* | 5/2013 | McHorris | G06Q 10/04 705/329 |
| 2017/0186065 A1* | 6/2017 | Zhu | G06Q 30/0621 |

* cited by examiner

*Primary Examiner* — Pierre M Vital
*Assistant Examiner* — Andalib F Lodhi
(74) *Attorney, Agent, or Firm* — Schwegman Lundberg & Woessner, P.A.

(57) ABSTRACT

A system and method for generating modifiers for updated search queries are provided. In example embodiments, metadata is accessed, the metadata corresponds to search results of an input query and comprising a plurality of candidate modifiers. A score is calculated for each candidate based on a relevance value that indicates the correlation between a candidate modifier and the input query. A list of top number of candidate modifiers is generated based on the score of the candidate modifier transgressing a first threshold. A uniqueness score is calculated for combination pairs of candidate modifiers within the list, the uniqueness score being used to eliminate candidate modifiers. The list of top number of candidate modifiers is presented, at a user interface, according to a ranked order based on the score.

20 Claims, 7 Drawing Sheets

QUERY 300 : LINKEDIN ( MODIFIER 1 390 )  ( MODIFIER 2 392 )  ( MODIFIER 3 394 )  ( MODIFIER 4 396 )

SEARCH RESULT: DOCUMENT 1 310

MICROSOFT 350

ACQUISITION 355

SEARCH RESULT: DOCUMENT 2 320

IPO 360

NYSE: LNKD 365

SEARCH RESULT: DOCUMENT 3 330

FACEBOOK 370

SOCIAL NETWORK 375

○
○
○

SEARCH RESULT: DOCUMENT N 340

MOUNTAIN VIEW 380

JEFF WEINER 385

GENERATING MODIFIERS FOR UPDATING SEARCH QUERIES

TECHNICAL FIELD

Embodiments of the present disclosure relate generally to search engines and, more particularly, but not by way of limitation, to generating modifiers for updating search queries.

BACKGROUND

Search engines are designed to search and identify content, within a database, that correspond to an input query. Search engines depend heavily on the input search query to improve a search experience. Often, where the search query is short, it is difficult to determine user intent in order to return results that accurately reflects user intent, especially where the intent is not readily apparent on the face of the search query. User search queries may not accurately reflect user search intent for a variety of reasons including a user not knowing how to accurately describe what they are thinking or a user not entering terms that accurately reflect what the user is thinking. As a result, query results do not accurately reflect user intent leading to poor search experiences.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, systems and methods for generating modifiers to update search queries are described. These modifiers serve to guide an initial search query to more accurately reflect search intent by recommending modifiers to adjust the initial search query and the search result. A modification system is used to accesses metadata corresponding to search results of an input query, the metadata comprising a plurality of candidate modifiers. The modification system calculates a modifier score for each candidate modifier based on a variety of modifier properties including relevance, mutual information, uniqueness, purity, frequency, etc. The candidate modifiers are ranked according to the modifier score and presented, at a user interface, for selection. In response to a selection of a candidate modifier, the query is modified to incorporate the initial query with the selected candidate modifier. Search results are updated to reflect the modified query and more candidate modifiers are presented for the modified query. Herein, query input is used in its broadest sense and may be in example form of text input, a selection of a search filter presented at a user interface, or audio input converted to text format.

Figure 1:
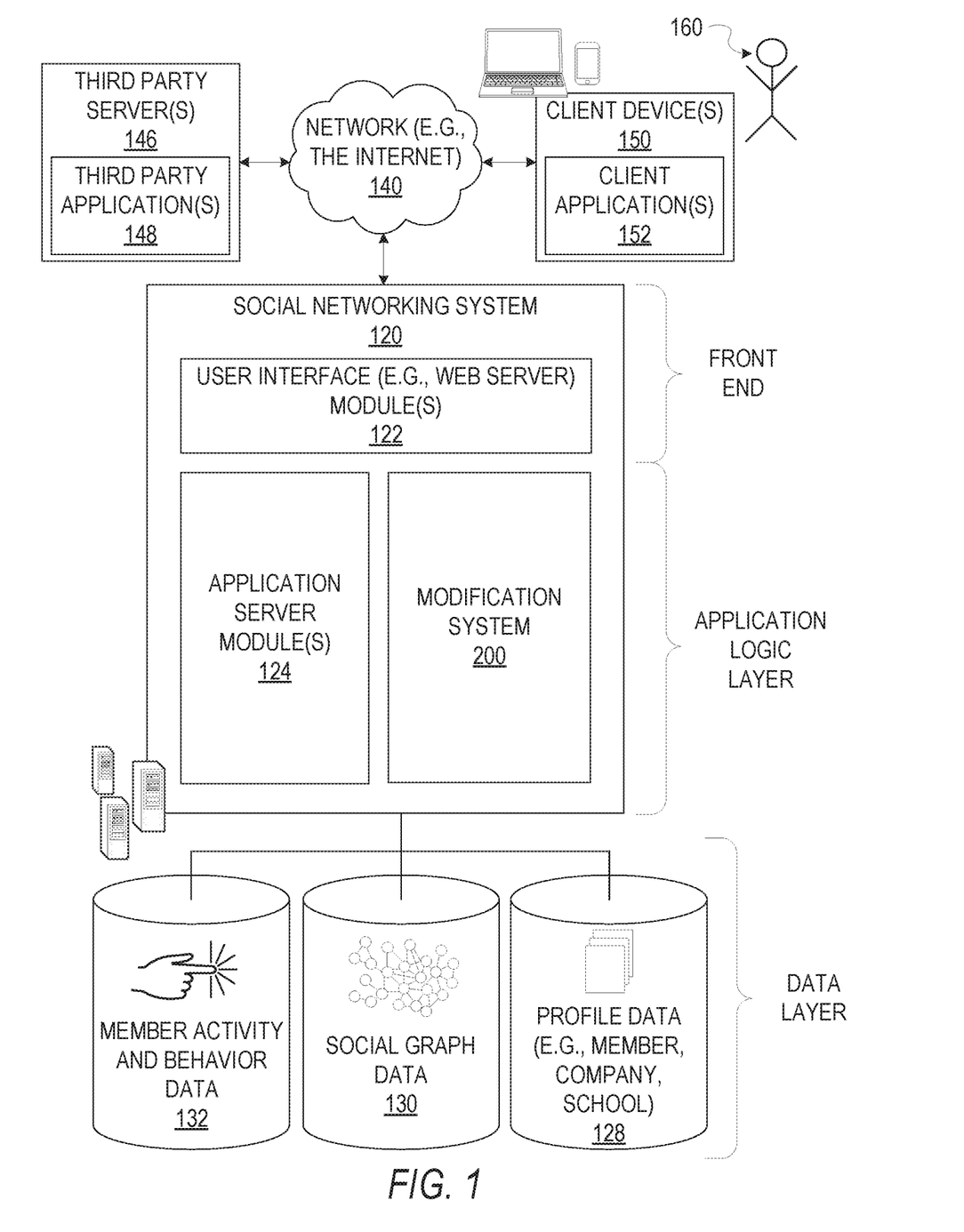
FIG. 1 is a network diagram depicting a client-server system within which various example embodiments may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a modification system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
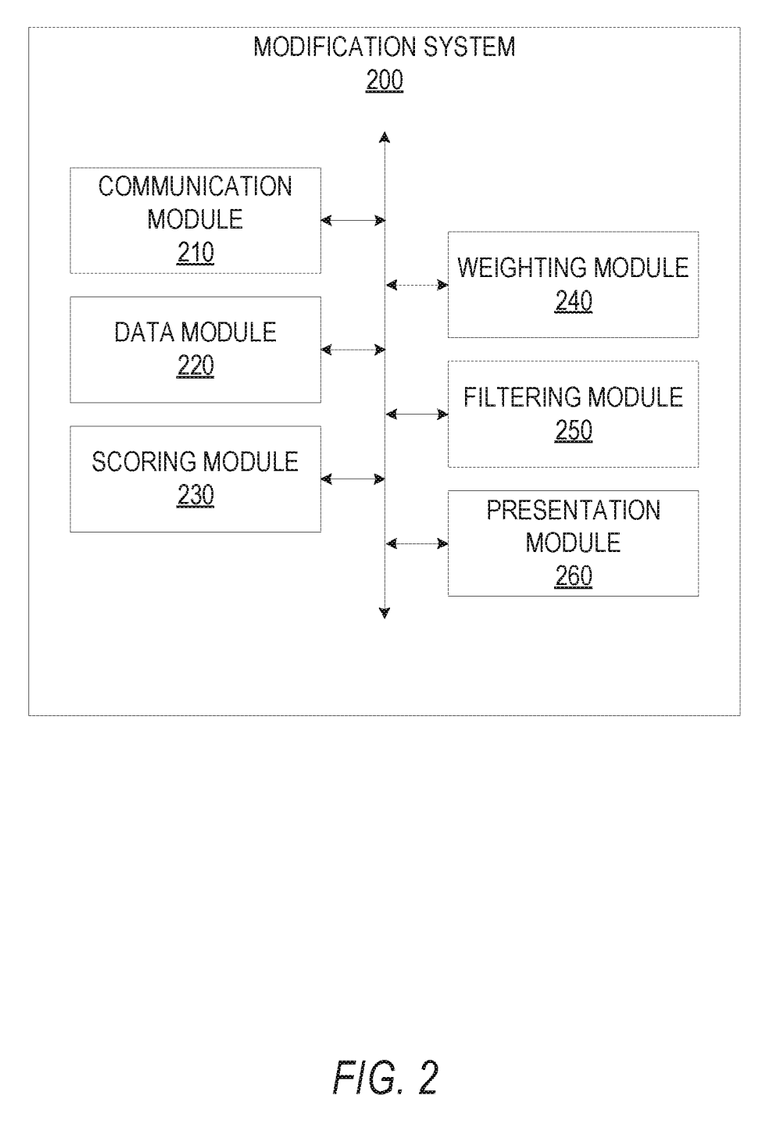
FIG. 2 is a block diagram illustrating an example embodiment of a modification system, according to some example embodiments.

FIG. 2 is a block diagram illustrating components provided within the modification system 200 for modifying input queries, according to some example embodiments. The modification system 200 includes a communication module 210, a data module 220, a scoring module 230, a weighting module 240, a filtering module 250, and a presentation module 260. Modifiers are used to modify an initial input query, narrow down search results, and more accurately reflect user intent. In example embodiments, modifiers are generated and presented by the modification system 200, in response to a user query input. The modifiers are generated using metadata associated with search results of the user query input. The metadata is used to generate candidate modifiers that are scored and ranked. The top-N candidate modifiers are selected as modifiers to be presented at a user interface. In response to a selection of a modifier, the user query input is modified by the selected modifier and search results are presented for the modified query. The algorithm repeats such that modifiers are generated, scored, and ranked to be presented in response to the modified query. In other embodiments, more than one modifiers can be selected at once and query inputs are modified according to the more than one selected modifiers.

All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 may also provide various web services functions such as retrieving information from the third party servers 146 and the social networking system 120. In this way, the communication module 220 facilitates the communication between the modification system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as accessing, exchanging, and storing information with databases or servers. For example, data module 220 may store and access metadata containing candidate modifiers, modifier scores calculated for each candidate modifier for corresponding input queries, weights determined by machine learning for each attribute used to calculate the modifier score, and the like. In some example embodiments, the data module 220 may exchange information with third party servers 146, client devices 150, and other sources of information.

The scoring module 230 is configured to calculate a modifier score for each candidate modifier for an input query. In response to the input query, a search engine within social networking system 120 returns a search result comprising of a list of results. The results can be in example form of documents, user posts, images, videos, articles, hyperlinks, or the like. The scoring module 230 accesses metadata corresponding to each result within the list of results, the metadata comprising topics assigned to the result that describes the content of the result. The topics are selected as candidate modifiers to be scored and ranked to determine a top selected predetermined number of modifiers to be presented at a user interface.

The scoring module 230 scores candidate modifiers based on a weighted sum of modifier properties including a relevance score, personalization score, and purity score, where the variables include user historical data, the input query, search results, and all other candidate modifiers. In other words, the relevance score, purity score, and personalization score are based on user historical data, the input query, search results, and all other candidate modifiers as fully described in detail below. The candidate modifiers are ranked according to the modifier score. A top number of candidate modifiers are selected based on the ranked modifier score for filtering by the filtering module 250. In a specific example, the modifier score is determined as follows: Modifier Score=$W_1$Relavence Score+$W_2$Personalization Score+$W_3$Purity Score, where W is the relative weights given to each corresponding score as described in associated with the weighting module 240.

Relevance score is a calculation of how relevant a candidate modifier would be for the input query. The scoring module 230 calculates the relevance score based on a weighted sum of a coverage score, mutual relevance ($MI_{Relevance}$) score, and term frequency inverted document frequency (TFIDF) score, or any combination thereof. The determination of how relevant a candidate modifier is to an input query is based on a variety of attributes including the number of search results containing the candidate modifier (coverage score), the mutual dependence between the candidate modifier and the input query (mutual information score), and the importance of the candidate modifier to the search results (TFIDF score). In a specific example, the relevance score is determined as follows: Relevance Score=$V_1$Coverage Score+$V_2$Mutual Relevance Score+$V_3$TFIDF Score, where V is the relative weights given to each corresponding score as described in associated with the weighting module 240. These scores are described in detail below.

In various embodiments, the following notations are used to determine which modifiers are selected and presented for an input query. For a given query $q \in Q$, a user $u \in M$, and a result set $R \subset D$, the modification system 200 generates an ordered set G of K modifiers with $G=\{g_1, g_2, \ldots g_k\}$, where the modifiers are ranked according to value, such that a modifier with a smaller index is more valuable. q denotes the input query, Q denotes a query collection, M denotes the member collection within the social networking system 120, R denotes the results for the input query q, and D denotes a global collection of documents available within the social networking system 120. It is noted that modifier set G depends on q, u and R, where R can be split by G into $R^{g_1}$, $R^{g_2}, \ldots, R^{g_k}$.

The coverage score is one attribute in determining the relevance score. The coverage score, $|R^{g_i}|$, is calculated based on the number of search results containing the candidate modifier $g_i$. Intuitively, a higher frequency of occurrence among search results equates to a better candidate as a modifier in terms of coverage. In an example, referring to FIG. 3, for search query input LinkedIn 300, the coverage score is calculated based on the number of search results (within search results 310, 320, 330, 340) contains the candidate modifier $g_i$. In one example, for the candidate modifier IPO (initial public offering), one search result, result 320, contains the candidate modifier IPO. Viewed another way, in this example, coverage determines how many documents contains both the candidate modifier IPO and the search input query LinkedIn. In various embodiments, the calculation considers the top N search results, where N is a predetermined threshold to reduce computation bandwidth requirements on the system.

In further embodiments, the mutual relevance score is another attribute in determining the relevance score. A phrase that occurs in more search results when compared to another phrase may be less informative when representing a distinct aspect of a query. As a result, a mutual relevance ($MI_{Relevance}$) score is used to measure the relatedness of a modifier to a query.

Figure 3:
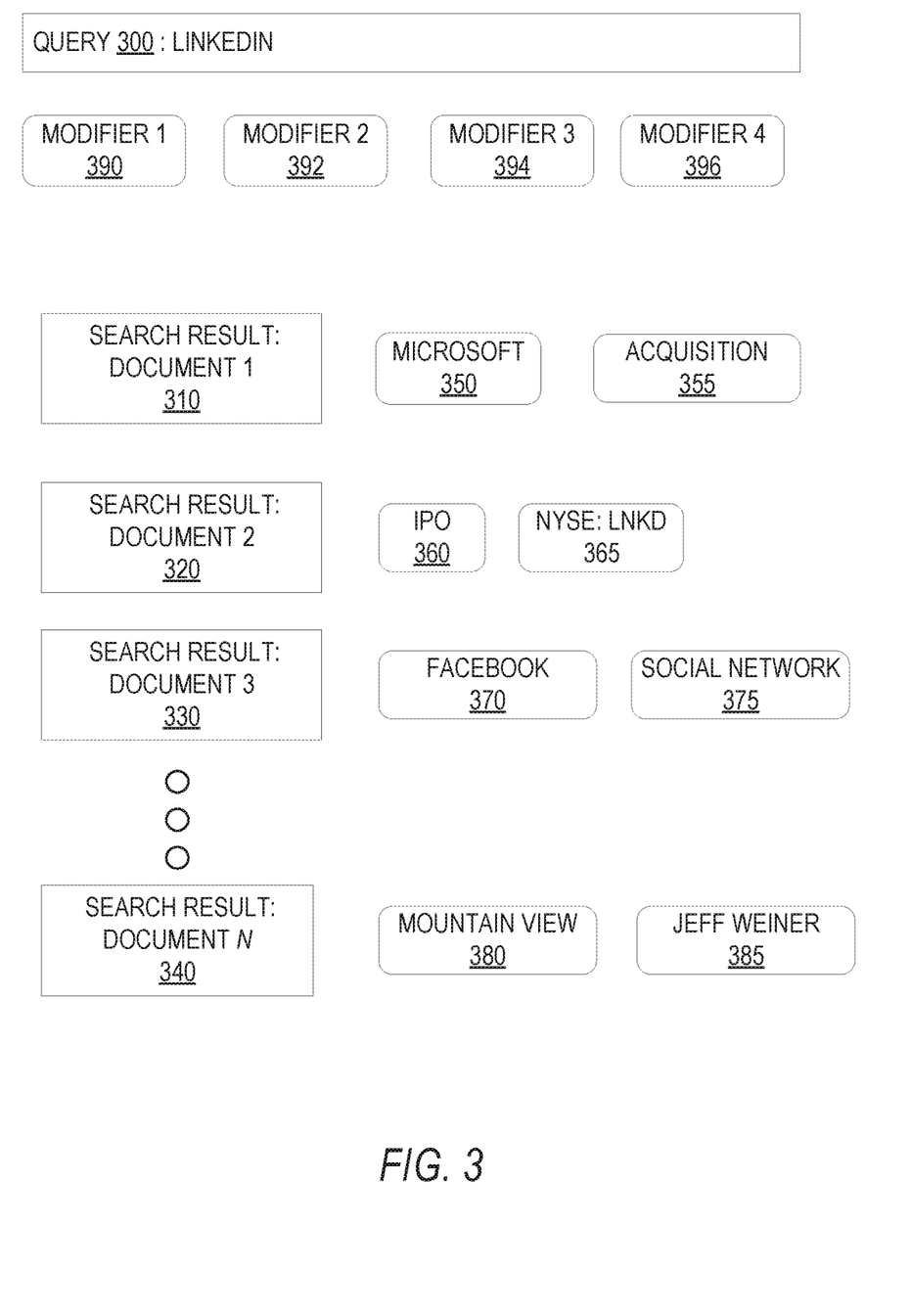
FIG. 3 is a flow diagram illustrating an example information flow for generating candidate modifiers, according to some example embodiments.

In a specific example, a mutual relevance score between an input query and candidate modifier is calculated as follows:

$$MI_{Relevance}(q, g_i) = \log\frac{p(q, g_i)}{p(q)p(g_i)} \text{ where, } (q, g_i) = \frac{|R^{g_i}|}{|D|}, p(q) = \frac{|R|}{|D|},$$

$$p(g_i) = \frac{|D^{g_i}|}{|D|} MI_{Relevance}(q, g_i) = \log\frac{p(g_i \mid q)}{p(g_i)} = \log\frac{|R^{g_i}| \cdot |D|}{|R| \cdot |D^{g_i}|}$$

where $MI_{Relevance}(q, g_i)$ is the mutual information score for the input query q and the candidate modifier $g_i$. As described above, $|R^{g_i}|$ is the coverage score determined by the number of search results containing the candidate modifier $g_i$. $|D|$ is the number of documents available within the social networking system 120. R is the number of results for the input query q. $|D^{g_i}|$ is the set of documents containing candidate modifier $g_i$ regardless of the input query. In one example, referring back to the input query LinkedIn 300, the MI score determines the extent to which a candidate modifier (such as modifier 350, modifier 355, modifier 360, modifier 365, modifier 370, and modifier 375) relates to the input query LinkedIn 300. As a result, a larger MI score reflects a large overlap (e.g., a high mutual dependence between the two variables) between the modifier and the query and therefore the more related the modifier is to the query.

In further embodiments, a mutual relevance score, $MI_{Relevance}(q, g_i)$, would favor rare modifiers with small $p(g_i)$. As a result, an alternative to the mutual relevance score for measuring the relatedness of a guide to a query is a relatedness score. In some embodiments, the relatedness score may be used in conjunction to or in replacement of the mutual relevance score to determine the relevance score.

In a specific example, a relatedness score between an input query and candidate modifier is calculated as follows:

$$\text{relatedness}(q, g_i) = (p(g_i \mid q) - p(g_i)) \cdot \log\frac{p(g_i \mid q)}{p(g_i)}$$

In yet further embodiments, the term frequency inverted document frequency (TFIDF) score is one attribute in determining the relevance score. The TFIDF score is used to evaluate how important the candidate modifier is in a collection of documents. The importance of the candidate modifier increases proportionally to the number of times the candidate modifier appears in a document but is offset by the frequency of the candidate modifier in the collection of documents. In one embodiment, the collection of documents is the collection of search results returned for an input query. In another embodiment, the collection of documents is the global collection of all documents available.

In a specific example, the TFIDF score based on the search result is determined as follows:

$$TFIDF_1 = Freq(g_i; R) \cdot \log\frac{|R|}{|R^{g_i}|}$$

where $Freq(g_i; R)$ is the number of times the candidate modifier $g_i$ occurs in the result set R. $|R^{g_i}|$ is the coverage score determined by the number of search results containing the candidate modifier $g_i$.

In another embodiment, the collection of documents is the global collection of documents, $|D|$, available within the social networking system 120. In a specific example, the TFIDF score based on the global document collection is determined as follows:

$$TFIDF_2 = Freq(g_i; R) \cdot \log\frac{|D|}{|D^{g_i}|}$$

where $Freq(g_i; R)$ is the number of times the candidate modifier $g_i$ occurs in the result set R. $|D^{g_i}|$ is the set of documents containing candidate modifier $g_i$ in the global document collection, regardless of the input query.

In various embodiments, a personalization score is one attribute in determining the score for the candidate modifiers. Unlike the other candidate modifier properties, the personalization score focuses on the input query rather than the query result. The scoring module 230 accesses user historical data within database 128, 130, and 132 to determine past queries entered by users that include the current input query. Within the past queries, the scoring module 230 determines the frequency in which a candidate modifier is included with the input query. For instance, for an input query LinkedIn, the scoring module 230 accesses past queries that contain the input query LinkedIn, in whole or in part. These past queries can include query one (e.g., LinkedIn), query two (e.g., LinkedIn+software engineer), and the like. For each of these past queries, the scoring module 230 calculates the frequency in which "software engineer" is included with the input query "LinkedIn," where "software engineer" is a candidate modifier. Further, the scoring module 230 calculates the frequency in which query one is entered and subsequently updated with query two, which includes query one.

In various embodiments, for each candidate modifiers, the scoring module 230 calculates a modifier score based on a weighted sum of the relevance score and personalization score. A top predetermined number of candidates are selected based on the top modifier scores. The scoring module 230 calculates a modifier score for each of the top selected candidates, the modifier score being calculated based on a weighted sum of the purity score and uniqueness score. The processing power required for calculating the relevance score and personalization score are less computationally heavy when compared to the other scores (e.g., purity score and uniqueness score) because the other scores depend on other modifiers. As a result, performing the computational less intensive functions to determine the modifier score, selecting a top predetermined number of candidates based on those scores, and calculating a modifier score based on those top selected candidates increases computational efficiency. In other embodiments, the modifiers are scored based on a weighted sum of the relevance score, personalization score, and purity score, without the pre-selection of top-N candidate modifiers. The weights used are provided by the weighting module 240 as described below.

In various embodiments, a purity score is one attribute in determining the modifier score for the candidate modifiers. A purity score measures the extent to which a candidate modifier occurs in one result and not other results, thereby measuring the purity of the candidate modifier's occurrence. The more pure the candidate modifier, the less of an overlap of results between one candidate modifier when compared to another candidate modifier. Purity indicates that the search result cluster represented by the candidate modifier centers around one or a small set of topics. In other words, a higher the purity score of a candidate modifier indicates less frequency of occurrence along with other candidate modifiers. A purity score is calculated based the entropy measurement comparison between a candidate modifier and all other candidates. In one example, where the input query is Stanford University, a candidate modifier of "student" may have very low purity since the modifier "student" is likely to occur in many of the query results and therefore does not center around one or a small set of topics. A candidate modifier that occurs in many query results with high topic variability is less useful as a modifier.

In a specific example, the purity score is determined as follows:

$$\text{Purity} \equiv \text{Entropy}(g_i) = -\sum_{g_j \in G, g_j \neq g_i} \frac{|R^{g_i} \cap R^{g_j}|}{|R^{g_i}|} \cdot \log \frac{|R^{g_i} \cap R^{g_j}|}{|R^{g_i}|}$$

where $|R^{g_i}|$ is the coverage score determined by the number of search results containing the candidate modifier $g_i$. $R^{g_j}$ is the coverage score determined by the number of search results containing the candidate modifier $g_j$. Intuitively, if candidate modifier $g_i$'s result set highly overlaps with candidate modifier set, then $g_i$ might be too general. As a result, the candidate modifier would be ambiguous and not a good modifier to recommend. In other words, candidate modifier $g_i$ is purer in terms of the information it carries if it has less query result overlap with the other candidate modifiers or the query result of the other candidate modifiers are distributed unevenly in the $g_i$'s space.

The weighting module 240 is configured to determine the weights assigned to each score (e.g., coverage score, $\text{MI}_{Relevance}$ score, and TFIDF score) for calculating the weighted sum of the relevance score. The weighting module 240 further determine the weights assigned to the relevance score, personalization score, and purity score for calculating a candidate modifier score. The weights may be predetermined such that they are assigned a fixed value. In other embodiments, the weights are determined using machine learning algorithm using user data inputs. The user data inputs include historical data of users within the database 128, database 130, and database 132 that reflect the behavior and sequence of modifier selection by users for corresponding input queries. The database 128, database 130, and database 132 contain which candidate modifiers that users have picked for a given query, the data becomes training data in the machine learning model to determine weights to assign to each score (e.g., relevance score, coverage score, mutual information score, TFIDF score, personalization score, and purity score). Example machine learning algorithms include Linear Support Vector Machine (SVM), Radial Basis Function (RBF) SVM, Decision Tree, Random Forest, AdaBoost, Naïve Bayes, and multi-class logistic regression model.

The filtering module 250 is configured to further filter candidate modifiers for presentation. As described above, the scoring module 230 scores candidate modifiers based on a weighted sum of modifier properties including a relevance score, personalization score, and purity score as fully described above. The candidate modifiers are ranked according to the scores of the candidate modifiers.

The top predetermined number of candidate modifiers are selected for further filtering by the filtering module 250. For instance, the top-N candidate modifiers may be the top twenty in efforts to reduce computational requirements. The top-N candidate modifiers depend on the number of candidate modifiers allocated to be presented in view of the screen size at the user interface. Where the screen size is from a mobile device, the number of candidate modifiers to be presented are less than that compared to a computer. In other embodiments, the top predetermined number of candidate modifiers are dynamic and based on the candidate modifier score transgressing a threshold value.

The top-N candidate modifiers are compared against each other to determine the extent in which candidate modifiers capture distinct aspects of the input query with minimum search result overlap. The distinct aspects are reflected by a uniqueness score. The filtering module 250 calculates the uniqueness score based on the mutual information between two candidate modifiers. (It is noted that the mutual information in determining the relevance score is based on the mutual information between the candidate modifier and the input query). The mutual information between two candidate modifiers determines the degree in which they relate to each other. The filtering module 250 processes each candidate modifier to determine whether to keep the candidate modifier or not based on a calculated mutual information score, herein denoted as $\text{MI}_{Uniqueness}$. The score indicates a relatedness between the two candidate modifiers (e.g., a mutual dependence between the candidate modifiers), showing the number of search result overlap between the candidate modifiers.

In one example, top-N candidate modifiers include {c1, c2, c3, c4, ... c-N}, where c1 is kept due to it being the first ranked candidate modifier. The filtering module 250 moves on to process candidate modifier c2 by computing the $\text{MI}_{Uniqueness}$ score between c2 and c1. If the $\text{MI}_{Uniqueness}$ score (c1, c2) is above a relatedness threshold (e.g., indicating they are related to each other), the filtering module 250 removes c2 from the list. Otherwise, if the $\text{MI}_{Uniqueness}$ score (c1, c2) is below the relatedness threshold candidate modifier c2 is not eliminated. The relatedness threshold indicates that above the threshold, there is a high relatedness between the two candidate modifiers (e.g., a high mutual dependence between the candidate modifiers), resulting in a larger number of search result overlap between the candidate modifiers. Where there is a large number of search result overlap between the candidate modifiers, it is not necessary to keep both, since one adequately captures the search result information for the user.

The filtering module 250 moves on to process candidate modifier c3 and calculates the $\text{MI}_{Uniqueness}$ score between c3 and all prior kept candidate modifiers, including $\text{MI}_{Uniqueness}$ score (c1, c3) and $\text{MI}_{Uniqueness}$ score (c2, c3), if c2 is kept earlier. If c2 is removed earlier, then only $\text{MI}_{Uniqueness}$ score (c1, c3) is used to determine whether to keep or remove candidate modifier c3. If any of the MI score above a relatedness threshold, the filtering module 250 removes c3 from the list. Otherwise, if the $\text{MI}_{Uniqueness}$ score between c3 and all prior kept candidate modifiers is below the relatedness threshold, candidate modifier c3 is not eliminated and therefore kept. The process continues for the remaining c4, c-N, and so on and so forth.

In one example, comparing candidate modifier 360 (IPO) with candidate modifier 365 (NYSE: LNKD), a high $\text{MI}_{Uniqueness}$ score (above the relatedness threshold) indicates the two modifiers are highly related to each other such that where one modifier is present is one search result document, the other modifier would be also present in the same search result document. In such a scenario, the candidate modifier 360 (IPO) has a higher modifier score, and processed first and already kept in the top-N list. As a result, of the $MI_{Uniqueness}$ score (candidate modifier 360, candidate modifier 365) determined to be above the relatedness threshold, the candidate modifier 365 (NYSE: LNKD) is eliminated from the list of modifiers. The candidate modifier 365 (NYSE: LNKD) is eliminated since it is covered by the candidate modifier 360 (IPO). This is scenario, there are more search results including candidate modifier 360 (IPO) than candidate modifier 365 (NYSE: LNKD) and candidate modifier 360 (IPO) and candidate modifier 365 (NYSE: LNKD) share a large amount of search result overlap, therefore candidate modifier 365 may be eliminated from the list of top number of candidate modifiers since the candidate modifier 360 includes the majority of search results associated with candidate modifier 365.

In a specific example, the uniqueness score is determined as follows:

$$MI_{Uniqueness}(g_i, g_j) = \log\frac{p(g_i, g_j)}{p(g_j)p(g_i)} \text{ where } p(g_i, g_j) = \frac{|R^{g_i} \cap R^{g_j}|}{|R|},$$

$$p(g_i) = \frac{|R^{g_i}|}{|R|}, p(g_j) = \frac{|R^{g_j}|}{|R|}$$

R denotes the results for the input query. $R^{g_i}$ is the number of search results containing the candidate modifier $g_i$. $R^{g_j}$ is the number of search results containing the candidate modifier $g_j$.

In some implementations, the presentation module 260 is configured to present candidate modifiers at a user interface. In some embodiments, a content modifier list is generated from the list of candidate modifiers post filtering by the filtering module 250 and ranked according to the modifier score. A non-content modifier list includes time (one day, two days, one week, etc.), image, video, social network connection (first-degree connection, second-degree connection, etc.), along with other categories for filtering search results. The content modifier list allows for search modification based on the topics included within the search results. In contrast, the non-content modifier list allows for search modification based on other factors not related to the topics of the search results. Within a user interface, specific positions are reserved for placement of modifiers. For each reserved candidate modifier position, the presentation module 260 determines whether to select a candidate modifier from the content modifier list or non-content modifier list using machine learning algorithm. For instance, referring to FIG. 6, candidate modifier positions 630, 632, 634, 636, and 638 are reserved at these specific locations. For candidate modifier positions 630, the presentation module 260 determines whether a candidate modifier from the content modifier list or non-content modifier list should be placed in position 630. The presentation module 260 determines this for all remaining candidate modifier positions. The machine learning algorithm uses past user data including whether users selected modifiers from either the content modifier list or non-content modifier list presented at respective positions. Example supervised algorithms include Linear Support Vector Machine (SVM), Radial Basis Function (RBF) SVM, Decision Tree, Random Forest, AdaBoost, Naïve Bayes, and logistic regression model. In an alternative embodiment, whether a modifier is selected from the content modifier list or non-content modifier list as respective positions is predetermined.

In various implementations, the presentation module 260 presents or causes presentation of information (e.g., visually displaying information on a screen, acoustic output, haptic feedback). Interactively presenting information is intended to include the exchange of information between a particular device and the user of that device. The user of the device may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 260 provides many other user interfaces to facilitate functionality described herein. Further, it will be appreciated that "presenting" as used herein is intended to include communicating information or instructions to a particular device that is operable to perform presentation based on the communicated information or instructions via the communication module 210, data module 220, scoring module 230, weighting module 240, and filtering module 250.

FIG. 3 is a block diagram illustrating an example information flow for generating candidate modifiers. A user inters an initial query at query 300 "LinkedIn". The initial query is processed by a search engine of the social network system 120, and search results are returned for the query 300, including document 310, document 320, document 330, . . . , document 340. Search results may be in the form of a document, article, posting, blog, job posting, member profile, and the like. Each search document have corresponding metadata that include candidate modifiers. These candidate modifiers may be topics that describe the contents of the document, the topics assigned to the documents by the social networking system 120. Each document of the search result has corresponding metadata that describes the content of the result, the metadata being generated by the social networking system 120.

In an example, search results document 310 has corresponding candidate modifier 350 "Microsoft" and candidate modifier 355 "acquisition," search results document 320 has corresponding candidate modifier 360 "IPO" and candidate modifier 365 "NYSE: LNKD," search results document 330 has corresponding candidate modifier 370 "Facebook" and candidate modifier 375 "social network," search results document 340 has corresponding candidate modifier 380 "Mountain View" and candidate modifier 385 "Jeff Weiner." The scoring module 230 calculates a score for each candidate modifier within the search result and generate a list of top candidate modifiers. The filtering module 250 filters the list of top candidate modifiers to generate a final list of candidate modifiers, the final list being in a ranked order according to the score. The presentation module 260 then presents the candidate modifiers at a user interface at modifier 390, modifier 392, modifier 394, and modifier 396. In response to a selection of any of the presented candidate modifiers, the modification system updates the initial query 300 "LinkedIn" to include the selected candidate modifier. For instance, in response to modifier 390 being selected (modifier 390 being candidate modifier 360 "IPO" where candidate modifier 360 has the highest score calculated by the scoring module 230), the initial query 300 "LinkedIn" is updated to "LinkedIn+IPO." The search result is updated to reflect the modified query "LinkedIn+IPO."

Figure 4:
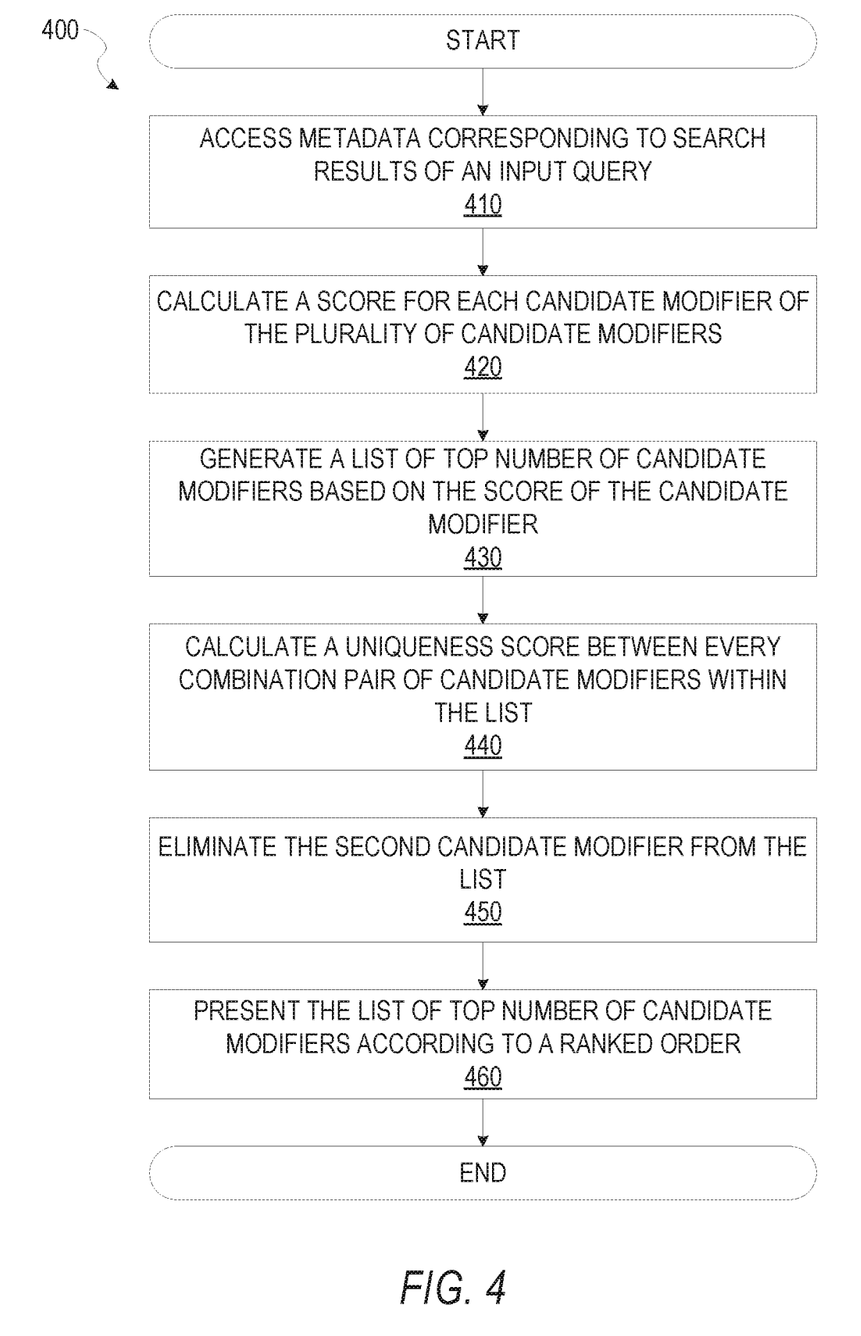
FIG. 4 is a flow diagram illustrating an example method for generating modifiers to update search queries, according to some example embodiments.

FIG. 4 is a flow diagram illustrating an example method 400 for generating modifiers to update search queries, according to example embodiments. The operations of the method 400 may be performed by components of the modification system 200. At operation 410, the system accesses metadata corresponding to search results of an input query, the metadata comprising a plurality of candidate modifiers. Each search result has corresponding metadata that describes the content of the result, whether the result is a document, article, blog, and the like. Further details of the metadata and candidate modifiers are fully described in association with FIG. 3.

At operation 420, the scoring module 230 calculates a score for each candidate modifier of the plurality of candidate modifiers based on a relevance value that indicates the correlation between a candidate modifier and the input query. The score is calculated based on a weighted sum of modifier properties including the relevance score, personalization score, and purity score. Further details of calculating a score are fully described in association with FIG. 2.

At operation 430, the scoring module 230 generates a list of top number of candidate modifiers based on the score of the candidate modifier transgressing a first threshold. The candidate modifiers are ranked according to the scores of the candidate modifiers. The top number of candidate modifiers are selected for further filtering by the filtering module 250.

At operation 440, the filtering module 250 calculates a uniqueness score for combination pairs of candidate modifiers within the list based on a mutual information calculation between a first candidate modifier and a second candidate modifier. The uniqueness score determines the amount of result overlap between the first candidate modifier and the second candidate modifier (e.g., the results that contain both the first candidate modifier and the second candidate modifier). Further details of filtering the list of candidate modifiers are fully described in association with FIG. 2.

At operation 450, the filtering module 250 eliminates the second candidate modifier from the list based on the uniqueness score transgressing a second threshold. Where there is a large amount of search result overlap between the first candidate modifier and the second candidate modifier, the second candidate modifier is eliminated from the list where the first candidate modifier has a larger number of more unique results that are not overlapped with the second candidate modifier. Further details of filtering the list of candidate modifiers are fully described in association with FIG. 2.

At operation 460, the presentation module 260 presents, at a user interface, the list of top number of candidate modifiers according to a ranked order based on the score for modification of the input query, the list being updated to reflect the eliminated second candidate modifier.

Figure 5:
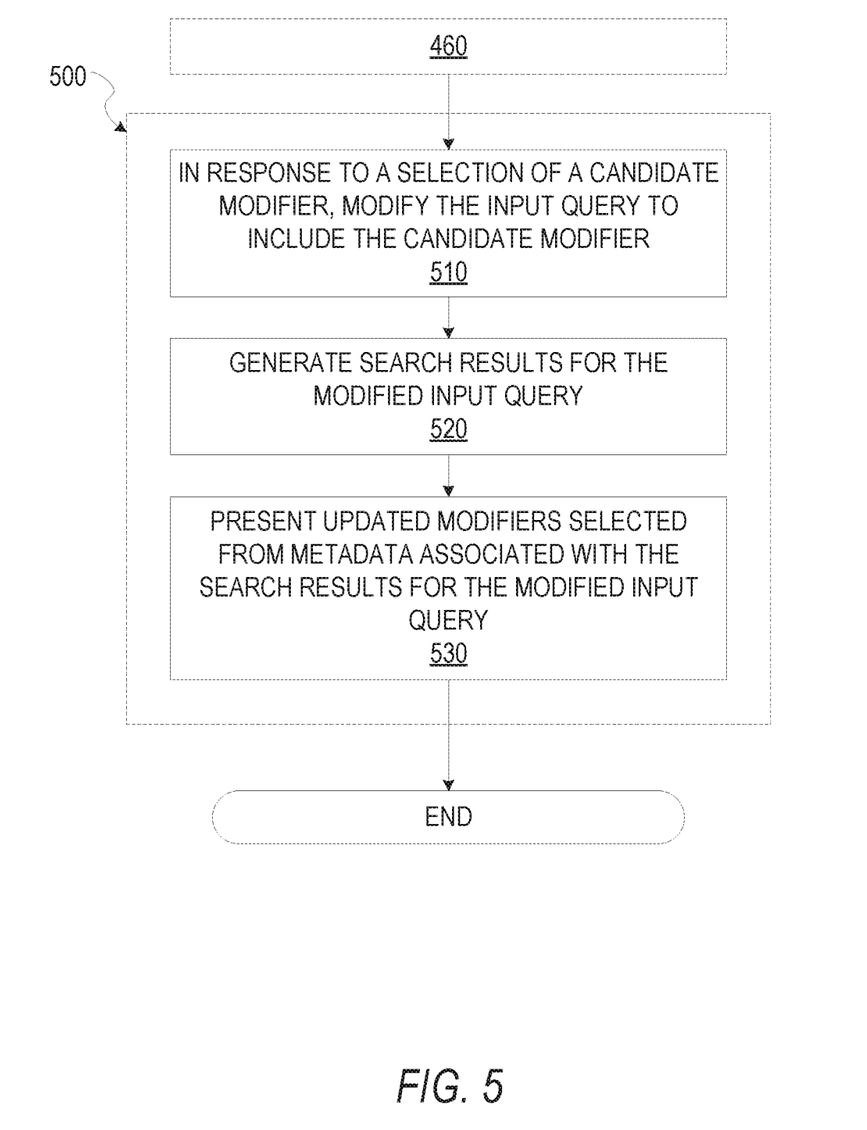
FIG. 5 is a flow diagram illustrating an example method for modifying an initial query, according to example embodiments.
Figure 6:
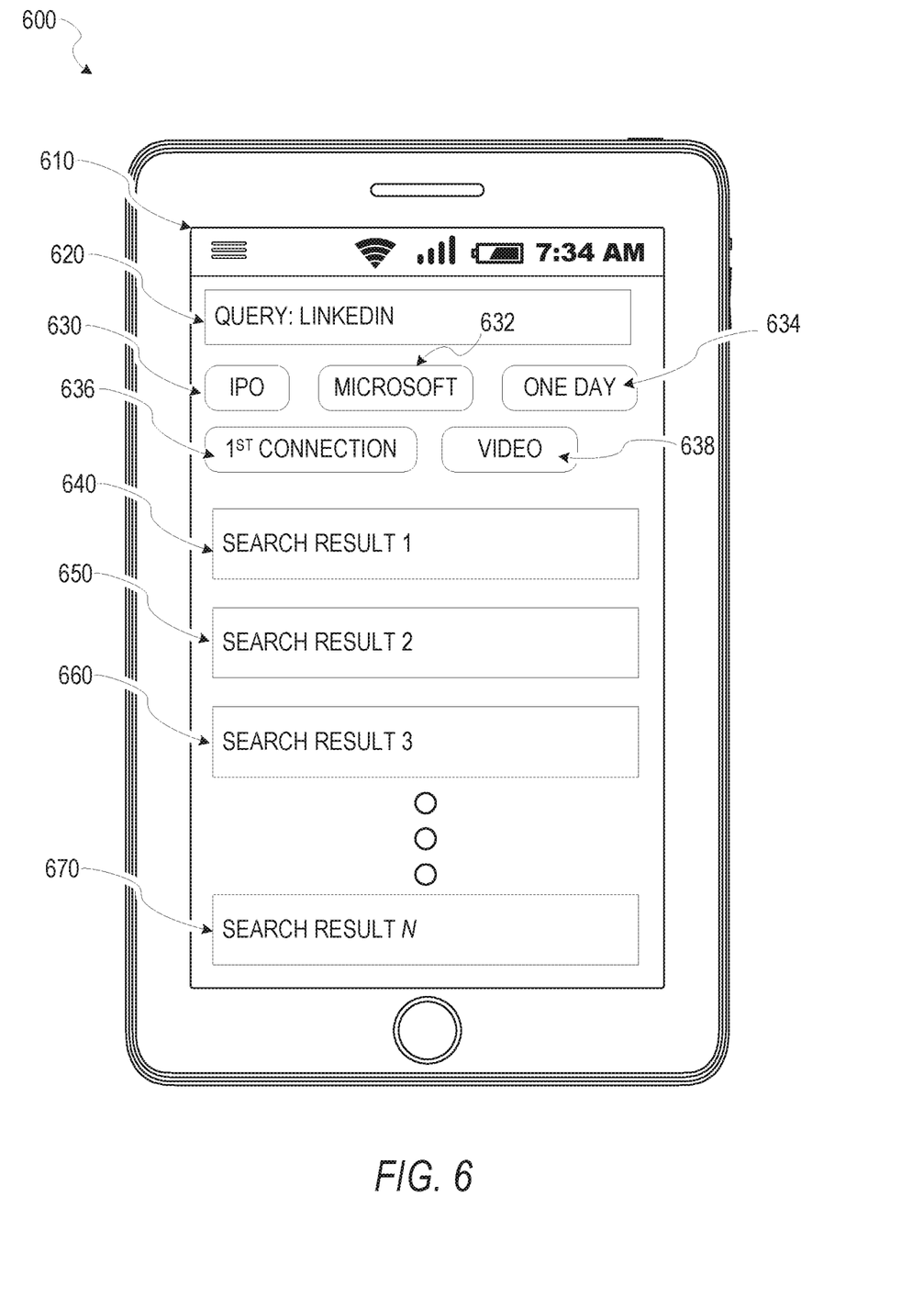
FIG. 6 illustrates an example user interface, according to some example embodiments.

FIG. 5 is a flow diagram illustrating an example method 500 for modifying an initial query, according to example embodiments. The operations of the method 500 may be performed by components of the modification system 200. At operation 510, the in response to a selection of a candidate modifier, social networking system 120 modifies the initial input query to include the candidate modifier. Referring to FIG. 6, in response to a selection of presented modifier 630 "IPO," the initial query 620 "LinkedIn" is modified to include the selected modifier 630 "IPO." The modified query would be "LinkedIn+IPO." In some embodiments, the modified query "LinkedIn+IPO" is visually presented where the initial query 620 slot was initially placed. In other embodiments, the initial query 620 slot remains the same with the selection modifier 630 being highlighted is a way to differentiate it from other presented modifiers (e.g., modifier 632, 634, 636, and 638) that have not been selected. In yet further embodiments, multiple modifiers may be selected at the same time for query modification.

At operation 520, the presentation module 260 generates search results for the modified input query. In response to a selection of modifier 630, the modified query "LinkedIn+IPO" is processed by the search engine of the social network 120, to return the results associated with the modified query "LinkedIn+IPO." In other embodiments, another search is not required to be processed, but rather the results of the initial query "LinkedIn" is filtered such that the results that correspond to the selected modifier 630 is presented.

At operation 530, the presentation module 260 presents updated modifiers selected from metadata associated with the search results for the modified input query, the updated modifiers being presented according to a ranked order based on relevance values that indicate the correlation between the updated modifiers and the modified input query. After the modifier 630 "IPO" is selected and the search results are updated to reflect the modified query "LinkedIn+IPO," the remaining modifiers are updated to reflect the modified query. In other embodiments, the other modifiers remain the same for further filtering of the modifier query.

FIG. 6 depicts an example device 600 (e.g., a smart phone) displaying an example user interface 610 that includes an initial query 620, search result including research result 640, 650, 660, and 670, and actionable items that include candidate modifier positions 630, 632, 634, 636, and 638, according to some example embodiments. In response to initial query 620 "LinkedIn," search results 640, 650, 660, and 670 are returned. From the search results 640, 650, 660, and 670, a list of top-N candidate modifiers are determined by the scoring module 230, weighting module 240, filtering module 250, and presentation module 260. At candidate modifier position 630, the presentation module selects a candidate modifier "IPO" from the content modifier list. A selection of modifier "IPO" would result in a modification of the input query from "LinkedIn" to the modified query "LinkedIn AND IPO." This modified query may be shown in replacement of input query 620. The search results 640, 650, 660, and 670 are updated to reflect the modified query such that the results contain both LinkedIn and IPO topics. At candidate modifier position 632, the presentation module selects a candidate modifier "Microsoft" from the content modifier list. At candidate modifier position 634, the presentation module selects a modifier "One Day" from the non-content modifier list. A selection of modifier "One Day" would result in filtering search results 640, 650, 660, and 670 to contain content published within the day. At candidate modifier position 636, the presentation module selects a modifier "$1^{st}$ Connection" from the non-content modifier list. A selection of modifier "$1^{st}$ Connection" would result in filtering search results 640, 650, 660, and 670 to contain content that is associated with the user's $1^{st}$ Connection, such that the $1^{st}$ Connection has engaged with the content (e.g., shared, commented, liked, etc.). At candidate modifier position 638, the presentation module selects a modifier "Video" from the non-content modifier list. A selection of modifier "Video" would result in filtering search results 640, 650, 660, and 670 to contain content that include video content.

Figure 7:
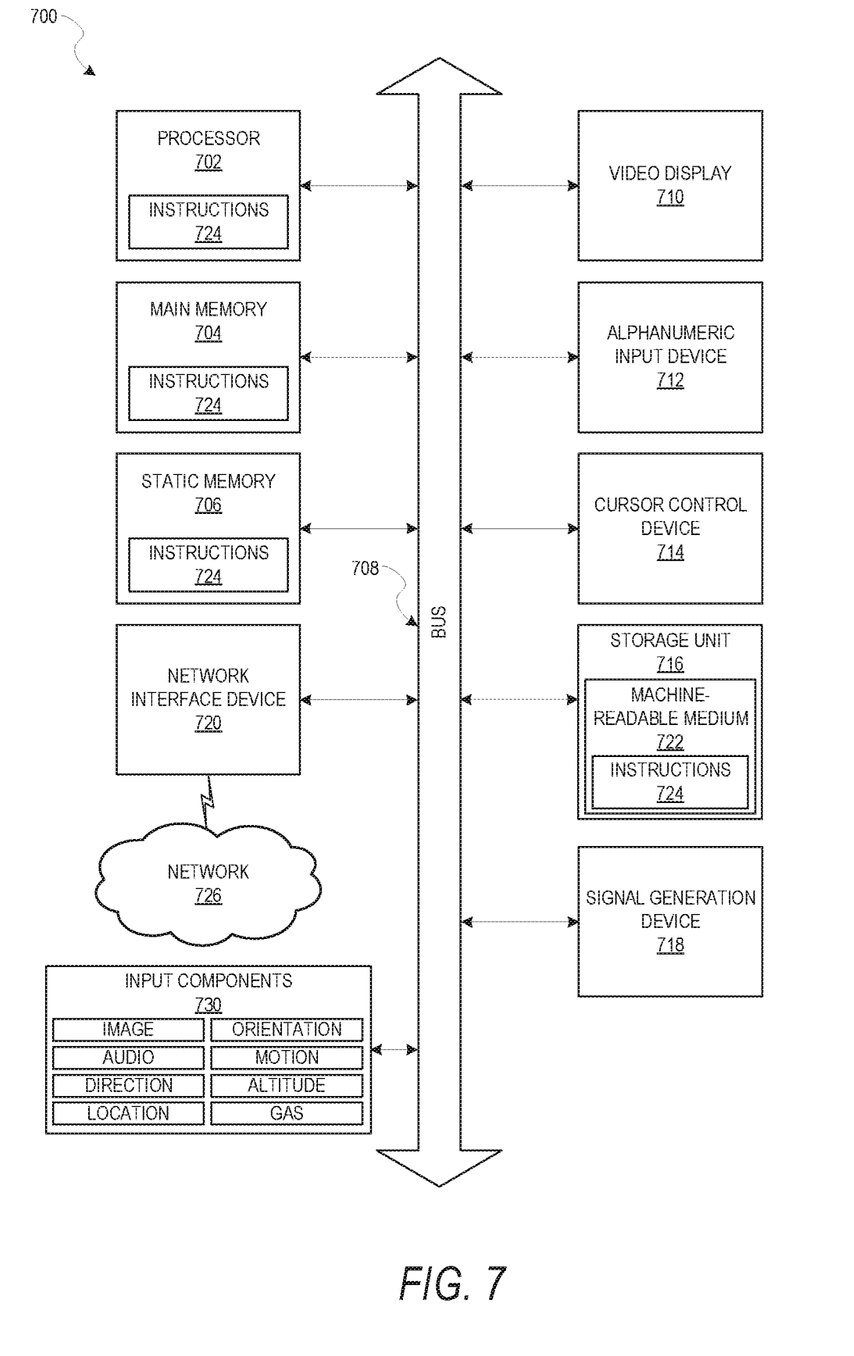
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies, associated with the modification system 200, discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Any of these machines can execute the operations associated with the modification system 200. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor, and a memory including instructions, which when executed by the processor, cause the processor to:
access metadata corresponding to search results of an input query, the metadata comprising a plurality of potential modifiers, each potential modifier being a different term for consideration of inclusion into the input query;
calculate a first score for each potential modifier of the plurality of potential modifiers based on a first value that indicates the correlation between a potential modifier and the input query;
generate a list of top potential modifiers, each of the top potential modifiers having a first score transgressing a first threshold;
calculate a second score for each combination of pairs of potential modifiers within the list, based on a mutual information calculation between a first potential modifier and a second potential modifier in each pair, the mutual information calculation indicative of a number of search results, in the search results, containing both the first potential modifier and the second potential modifier;
eliminate any second potential modifier, in the pairs of potential modifiers, that have a second uniqueness score transgressing a second threshold, from the list;
present, at a user interface, the list of top potential modifiers according to a ranked order based on the first score;
receive, from a user via the user interface, a selection of one or more of the top potential modifiers; and
process a modified search query, the modified search query comprising a combination of the input query and one or more selected potential modifiers.

2. The system of claim 1, wherein:
the relevance value is calculated based on a number of search results containing the candidate modifier being scored.

3. The system of claim 2, wherein:
the relevance value is calculated further based on a mutual information calculation between the candidate modifier being scored and the input query that indicates the relatedness between the candidate modifier being scored and the input query.

4. The system of claim 3, wherein:
the relevance value is calculated further based on a term frequency inverted document frequency calculation.

5. The system of claim 1, wherein:
the calculating the score of each candidate modifier is further based on a personalization score using past user input, queries.

6. The system of claim 1, wherein:
the calculating the score of each candidate modifier is further based on an entropy calculation that indicates the amount of query result overlap between each candidate modifier and other candidate modifiers.

7. The system of claim 1, further comprising:
in response to a selection of a candidate modifier, modify the input query to include the candidate modifier; and
generate search results for the modified input query.

8. The system of claim 7, further comprising:
present updated modifiers selected from metadata associated with the search results for the modified input query, the updated modifiers being presented according to a ranked order based on relevance values that indicate the correlation between the updated modifiers and the modified input query.

9. A method comprising:
using one or more computer processors:
accessing metadata corresponding to search results of an input query, the metadata comprising a plurality of potential modifiers, each potential modifier being a different term for consideration of inclusion into the input query;
calculating a first score for each potential modifier of the plurality of potential modifiers based on a first value that indicates the correlation between a potential modifier and the input query;
generating a list of top potential modifiers, each of the top potential modifiers having a first score transgressing a first threshold;
calculating a second score for each combination of pairs of potential modifiers within the list, based on a mutual information calculation between a first potential modifier and a second potential modifier in each pair, the mutual information calculation indicative of a number of search results, in the search results, containing both the first potential modifier and the second potential modifier;
eliminating any second potential modifier, in the pairs of potential modifiers, that have a second uniqueness score transgressing a second threshold, from the list;
presenting, at a user interface, the list of top potential modifiers according to a ranked order based on the first score;
receiving, receiving, from a user via the user interface, a selection of one or more of the top potential modifiers; and
processing a modified search query, the modified search query comprising a combination of the input query and one or more selected potential modifiers.

10. The method of claim 9, wherein:
the relevance value is calculated based on a number of search results containing the candidate modifier being scored.

11. The method of claim 9, wherein:
the relevance value is calculated further based on a mutual information calculation between the candidate modifier being scored and the input query that indicates the relatedness between the candidate modifier being scored and the input query.

12. The method of claim 9, wherein:
the relevance value is calculated further based on a term frequency inverted document frequency calculation.

13. The method of claim 9, wherein:
the calculating the score of each candidate modifier is further based on a personalization score using past user input queries.

14. The method of claim 9, wherein:

the calculating the score of each candidate modifier is further based on an entropy calculation that indicates the amount of query result overlap between each candidate modifier and other candidate modifiers.

15. The method of claim 9, further comprising:

in response to a selection of a candidate modifier, modify the input query to include the candidate modifier; and generate search results for the modified input query.

16. The method of claim 15, further comprising:

generating and presenting updated modifiers selected from metadata associated with the search results for the modified input query, the updated modifiers being presented according to a ranked order based on relevance values that indicate the correlation between the updated modifiers and the modified input query.

17. A machine-readable medium not having any transitory signals and storing instructions that, when executed by at least one processor of a machine, cause the machine to perform operations comprising:

accessing metadata corresponding to search results of an input query, the metadata comprising a plurality of potential modifiers, each potential modifier being a different term for consideration of inclusion into the input query;

calculating a first score for each potential modifier of the plurality of potential modifiers based on a first value that indicates the correlation between a potential modifier and the input query;

generating a list of top potential modifiers, each of the top potential modifiers having a first score transgressing a first threshold;

calculating a second score for each combination pairs of potential modifiers within the list, based on a mutual information calculation between a first potential modifier and a second potential modifier in each pair, the mutual information calculation indicative of a number of search results, in the search results, containing both the first potential modifier and the second potential modifier;

eliminating any second potential modifier, in the pairs of potential modifiers, that have a second uniqueness score transgressing a second threshold, from the list;

presenting, at a user interface, the list of top potential modifiers according to a ranked order based on the first score;

receiving, from a user via the user interface, a selection of one or more of the top potential modifiers; and processing a modified search query, the modified search query comprising a combination of the input query and one or more selected potential modifiers.

18. The machine-readable medium of claim 17, wherein the operations further comprise:

in response to a selection of a candidate modifier, modify the input query to include the candidate modifier; and generate search results for the modified input query.

19. The machine-readable medium of claim 18, wherein the operations further comprise:

generating and presenting updated modifiers selected from metadata associated with the search results for the modified input query, the updated modifiers being presented according to a ranked order based on relevance values that indicate the correlation between the updated modifiers and the modified input query.

20. The machine-readable medium of claim 17, wherein:

the relevance value is calculated based on a number of search results containing the candidate modifier being scored.

* * * * *

UNITED STATES PATENT AND TRADEMARK OFFICE
CERTIFICATE OF CORRECTION

PATENT NO.         : 10,726,023 B2
APPLICATION NO.    : 15/264433
DATED              : July 28, 2020
INVENTOR(S)        : Ni et al.

Page 1 of 1

It is certified that error appears in the above-identified patent and that said Letters Patent is hereby corrected as shown below:

In the Claims

In Column 20, Line 45, in Claim 9, delete "receiving, receiving," and insert --receiving,-- therefor In Column 21, Line 33, in Claim 17, after "combination", insert --of--

Signed and Sealed this
Tenth Day of November, 2020

Andrei Iancu
*Director of the United States Patent and Trademark Office*